United States Patent Office 2,918,727
Patented Dec. 29, 1959

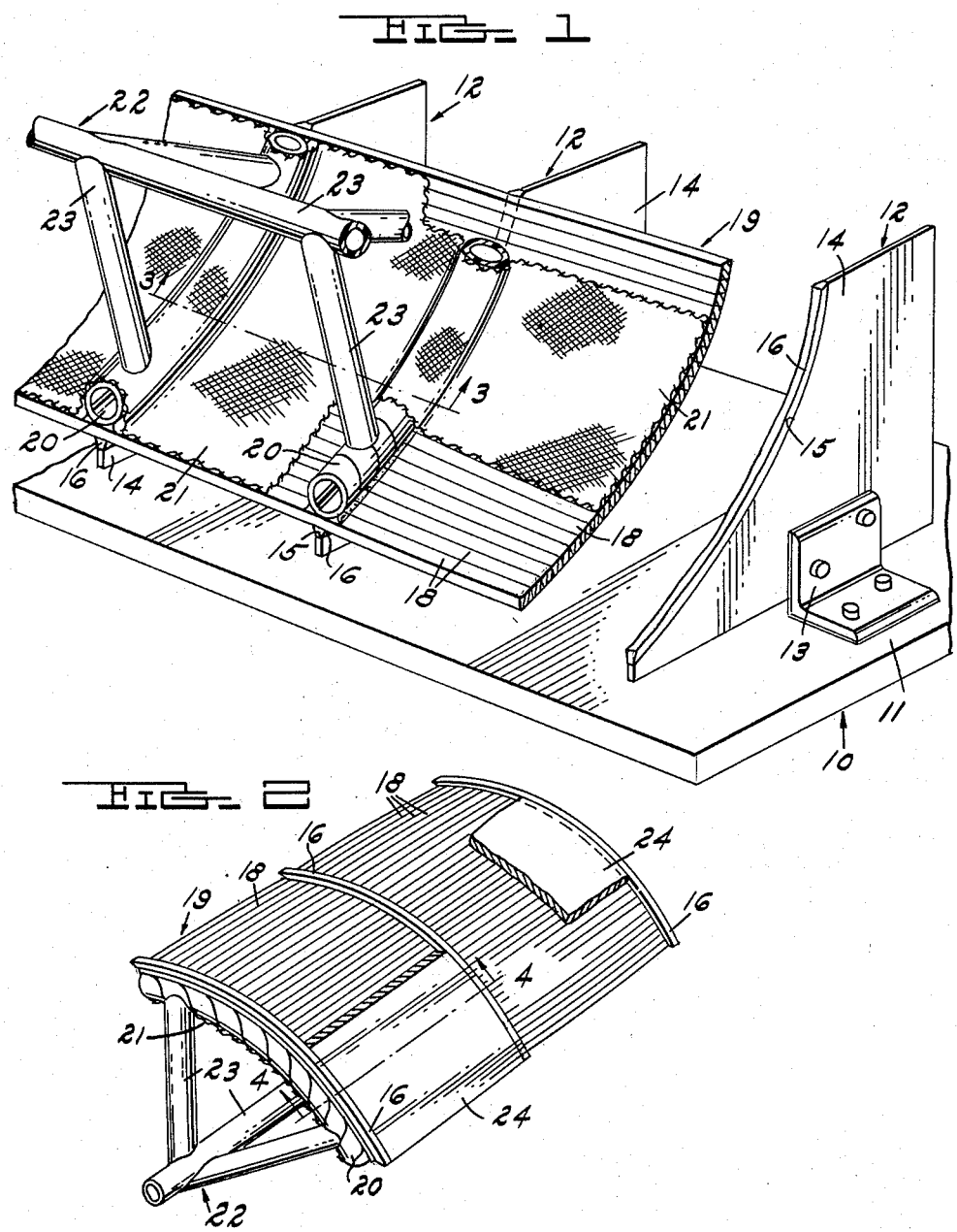

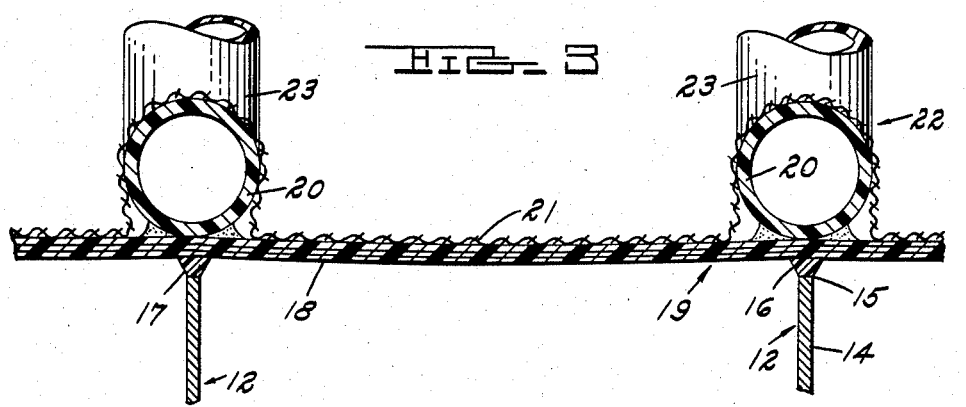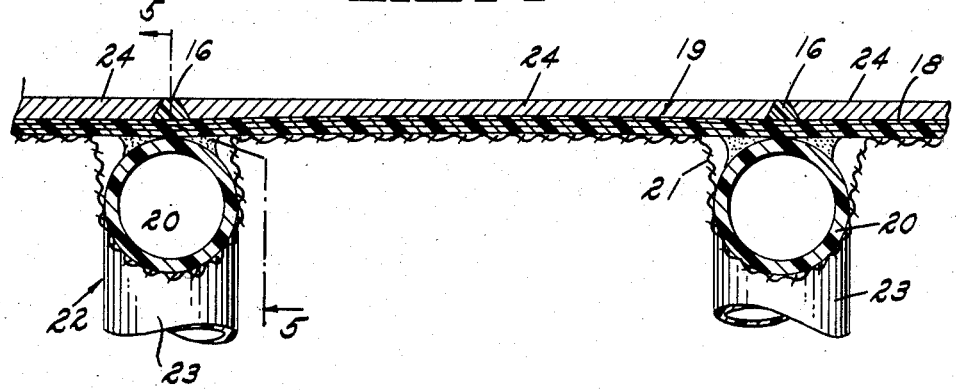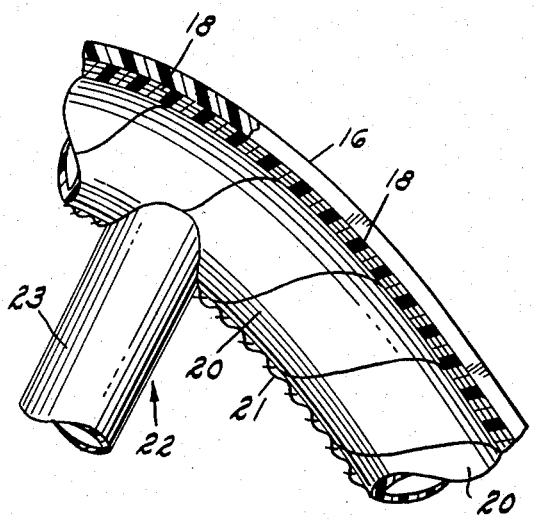

2,918,727
MASTER MODEL

Charles A. Genetti, East Lansing, Mich., assignor to Ren Plastics, Incorporated, Lansing, Mich., a corporation of Michigan Application October 5, 1956, Serial No. 614,275

11 Claims. (Cl. 33—174)

The present invention relates to an improved master model or like structure, and to a method of making the same.

In accordance with the invention, the model is fabricated throughout of non-metallic material, and is light in weight, accurate in contour and dimensionally stable. Models of the type contemplated are employed in the automotive industry, for example in making and checking parts, tools and fixtures, and the invention is primarily directed to the production of a master model for use in the automotive industry, though not exclusively limited in this respect.

The method of the invention provides an original model or like structure which adheres strictly to present model duplication procedure, without following presently employed aircraft or wood model procedures.

It will be apparent as the description proceeds that the method is also well suited to the production of mock-ups, duplications, and like structures.

It its an object of the invention to provide a method of producing a master model which generally follows the shrink-free core principle employed in the construction of models from plastic materials, such as an epoxy resin, and which involves a final splining in of the plastic material, in reference to contour template elements of plastic material incorporated in the model in an improved fashion. The method avoids the incorporation of metallic template elements permanently and integrally in the model, and in this respect is a departure from the principle of the invention illustrated and described in the copending application of Harold E. Renaud, Serial No. 613,063 filed October 1, 1956.

Another object is to provide an improved method of manufacturing master models which are very light in weight and inexpensive, and are not subject to parting of the splined-in plastic material from the template elements in reference to which it is splined-in. The invention affords a model which is unique in character, as compared with presently employed aircraft and wood model constructions.

Yet another object is to provide a high tolerance model structure of great accuracy. To this end the model incorporates a predominance of pre-cured plastic material, as compared with uncured or unset plastic material employed in binding together the cured components.

Briefly, this involves the application of elongated strips of cured glass laminate across accurately prefabricated template units presenting shot plastic template portions on which the laminate strips are applied in side by side relation to one another. The operation of "shooting" the plastic material, as the term is applied in the industry, is one in which the resinous material in a plastic condtion is molded along a shaped template or mold edge or surface, and then cured or set to provide a projecting plastic strip or layer in conformity with the contour of the template against which the plastic is shown. In accordance with the present invention, the template in question is an accurately contoured female template, and a suitable parting agent is applied thereto prior to shooting the plastic, so that when cured and removed the shot material presents an outer male surface in true conformity with the contour of the female template and the desired model surface. On the other hand, in the above identified Renaud application, the plastic is shot against a template element which only roughly or generally conforms with the contour of the ultimate product, the plastic being accurately contoured on its surface remote from that of the template into accurate conformity with the desired model contour. The strips are bonded to the shot plastic edges in accurate conformity therewith, being held against said edges by tubular back-up or reinforce members of cured plastic, which are bonded to the adjacent rear surface of the sheet structure represented by the strips along and in opposed relation to the respective lines of the template units. Upon setting of the bonding material the shot plastic edges are stripped from the remainder of the template units, which leaves a core base structure to which plastic material is applied, being bonded to the base between the shot plastic template elements, as well as to the sides of those elements themselves, in a laterally flush relation to the outer template portions or edges.

The foregoing as well as other objects will be made more apparent as this description proceeds, especially when considered in connection with the accompanying drawings, wherein:

Fig. 1 is a fragmentary perspective view, partially broken away and in section, illustrating in general the procedure of making a portion of a master model in accordance with the method of the invention, as well as being a rear view of said portion of the master model itself;

Fig. 2 is a fragmentary perspective view from the front of said master model portion, showing successive operations in its production;

Fig. 3 is a fragmentary view in enlarged scale in section along a line corresponding to line 3—3 of Fig. 1;

Fig. 4 is a view in enlarged scale and in section along a line corresponding to line 4—4 of Fig. 2, showing the model structure as parted or stripped, along with reference template edges of plastic material, from the remainder of the template structure; and Fig. 5 is a view in section along line 5—5 of Fig. 4.

In practicing the invention, a template structure, generally designated 10, is first produced and set up. This structure includes any suitable type of supporting frame, illustrated as a simple base or table 11, to which a series of female template units 12 are rigidly clamped in parallel, laterally spaced relation, as by means of angle iron brackets 13.

Each of the template units 12 includes a master female template member 14 of thin, sheet-like metal which is accurately shaped to provide a contoured edge 15 corresponding exactly to the contour of an outer surface element of the model desired to be produced. A parting agent such as wax (not shown) is applied to each of the edges 15 throughout their lengths, following which shot plastic material 16 such as an epoxy resin, thermally or otherwise settable, is applied along the prepared edge 15 and hardened. The plastic material is brought flush with the sides of the plate 14 at the meeting line of edge 15 and the shot plastic 16. Preferably, as illustrated in Fig. 3, the shot plastic is filleted somewhat at 17, its sides converging to the edge 15.

With a group of the template units 12 assembled and rigidly clamped in the desired and accurate spacing, lengths or strips 18 of cured fiber glass laminate are applied across the edges of the shot plastic elements 16, which subsequently constitute template elements of the ultimate model structure, and are bonded thereto as by an epoxy type resin adhesive which is cured or set and hardened. The laminate strips 18 may vary in thickness and width but are preferably approximately ⅛ inch in front to rear thickness. Their width may vary from, say, ¼ inch to perhaps several inches, depending upon the contouring of the template unit 12. As so applied they build up to a sheet-like base, generally designated by the reference numeral 19, which develops the contour of the shot plastic material 16 as the application of the strips proceeds, much in the manner a splining tool does in applying finish material.

Although the width of the strips 18 may vary for the reason mentioned, and also in accordance with the required stiffness of the base 19, their thickness must remain constant, for a reason which will appear. A single thickness layer of the successive, side by side strips 18 is illustrated, however it is within the contemplation of the invention that successive, rearwardly deposited layers may be built up, bonded and set, so long as overall thickness is maintained uniform. It has been found that if any given strip varies considerably in width or thickness along its length it will not maintain a true contour when bent across three or more templates, so that it is difficult to maintain accuracy.

Bonding engagement of the strips 18 with the shot plastic template elements 16 is effected by applying tubular lengths of flexible, spiral cut plastic tube 20 to the rear surface thereof, directly over or in opposed relation to the respective template units 14. The strips are held down by pressure applied to the tube rather than the strips.

The tubes 20 are bonded to the rear of the built up base 19, as by the use of epoxy plastic resin, and following setting, the gear employed to hold the tubes and strips in place is removed. The entire rearwardly exposed area of the model, including strips 18 and tubes 20, is then covered with a layer of fiber glass cloth 21, which is bonded to the area by a plastic adhesive. Suitable supporting and reinforcing frame work, generally designated 22, and preferably in the form of bonded lengths of plastic tubing 23, is then applied to the structure, cementing and setting the same to the shaping tubes 20, which also constitute part of the supporting and reinforcing structure.

The core or body and bonded template elements are then stripped from the plates 14 of the several template units 12, after which plastic molding compound 24, such as an epoxy resin, is splined in between the forwardly projecting template elements 16, in the manner shown in Figs. 2 and 5, and as further illustrated and described in the patent to Rauter 2,755,510 of July 24, 1956, being bonded to the forward surface of the shaped base 19 as well as to the sides of the template elements 16. The application of splined plastic is brought laterally flush with the outer edges of the elements 14 in the usual fashion, and is then cured and hardened to complete the model.

In practice, the thickness of the shot plastic template elements applied to the plates 14 may vary considerably. In the interest of maintaining the amount of uncured plastic compound 24 at a minimum, a thickness of, say, .060 inch is satisfactory. However, the thickness may be increased up to, say, ½ inch, although additional uncured compound is of course the result. The fiber glass strips 18 should be applied to the template edge as closely together as possible, and at the proper angle to the template unit 12 to obtain a desired and true contour, which is usually a right angle. The tubular backing members 20 and the supporting frame 22 constituted by the tubing 23 must be substantial enough to sustain stresses which may arise in the core or base 19 in the bending of the plastic strips 18. These strips, in turn, must be substantial enough to hold the finish, splined-in material 24 and the template elements 16 accurately to the original set up contours of the female template edges 15. This prevents warping or shrinking of the core such as would necessitate reshooting the templates with plastic.

The invention affords a method of making master models and the like, in which a core of cured, shrink-free material having the spring-like qualities of a glass laminate is employed to obtain accuracy of contour, and in which the splined-in and job-cured plastic, being relatively thin, is held dimensional accurate by the shrink-free core. The product is very light in weight, inexpensive, dimensionally stable, shrink and crack-free, and many duplications thereof may be made from a single set-up of the master female template members 14.

What I claim as my invention is:

1. A master model or like structure, comprising a shaped base body which has a shaped outer cross-sectional contour generally corresponding to that of said structure, an elongated template element of plastic material bonded to and along the outer side surface only of said body in the line of the outer cross-sectional contour thereof, said template element projecting outwardly of said body and presenting a longitudinally shaped outer reference edge which is in conformity with the outer contour of said structure in the direction of said contour line, and plastic molding material bonded to the outer side of said body and to said template element in laterally flush relation to said reference edge thereof.

2. A master model or like structure, comprising a supporting base fabricated of a series of strips of cured glass fiber arranged side by side in at least one layer of depth to provide a shaped base body which has a shaped outer cross-sectional contour generally corresponding to that of said structure, an elongated template element of plastic material bonded to and along the outer side surface only of said body in the line of the outer cross-sectional contour thereof, said template element projecting outwardly of said body and presenting a longitudinally shaped outer reference edge which is in conformity with the outer contour of said structure in the direction of said contour line, and plastic molding material bonded to the outer side of said body and to said template element in laterally flush relation to said reference edge thereof.

3. A master model or like structure, comprising a shaped base body of cured glass fiber which has a shaped outer cross-sectional contour generally corresponding to that of said structure, elongated template elements of plastic material bonded to and along the outer side surface only of said body in the line of the outer cross-sectional contour thereof, said template elements projecting outwardly of said body and presenting longitudinally shaped outer reference edges which are in conformity with the outer contour of said structure in the direction of said contour line, and plastic molding material bonded to the outer side of said body and between said template elements in laterally flush relation to said reference edges thereof.

4. A master model or like structure, comprising a supporting base fabricated of a series of strips of cured glass fiber arranged side by side in at least one layer of depth to provide a shaped base body which has a shaped outer cross-sectional contour generally corresponding to that of said structure, elongated template elements of plastic material bonded to and along the outer side surface only of said body in the line of the outer cross-sectional contour thereof, said template elements projecting outwardly of said body and presenting longitudinally shaped outer reference edges which are in conformity with the outer contour of said structure in the direction of said contour line, and plastic molding material bonded to the outer side of said body and between said template elements in laterally flush relation to said reference edges thereof.

5. A master model or like structure, comprising a supporting base fabricated of a series of strips of cured glass fiber arranged side by side in at least one layer of depth to provide a sheet-like body which has a shaped outer cross-sectional contour generally corresponding to that of said structure, reinforcing plastic material conformed to said general contour and bonded to the inner side of said body, elongated template elements of plastic material bonded to and along the outer side surface only of said body in outwardly projecting relation thereto, said template elements extending in the line of the outer cross-sectional contour of said body and presenting longitudinally shaped outer reference edges which are in conformity with the outer contour of said structure in the direction of said contour line, and plastic molding material bonded to the outer side of said body and to and between said template elements in laterally flush relation to said reference edges thereof.

6. A master model or like structure, comprising a sheet-like body which has a shaped outer cross-sectional contour generally corresponding to that of said structure, elongated reinforcing supports of tubular plastic material conformed to said general contour and bonded to the inner side of said body in transverse relation to said strips, elongated template elements of plastic material bonded to and along the outer side surface only of said body in outwardly projecting relation thereto and in opposed relation to said supports, said template elements extending in the line of the outer cross sectional contour of said body and presenting longitudinally shaped outer reference edges which are in conformity with the outer contour of said structure in the direction of said contour line, and plastic molding material bonded to the outer side of said body and to and between said template elements in laterally flush relation to said reference edges thereof.

7. A master model or like structure, comprising a supporting base fabricated of a series of strips of cured glass fiber arranged side by side in at least one layer of depth to provide a sheet-like body which has a shaped outer cross-sectional contour generally corresponding to that of said structure, elongated reinforcing supports of tubular plastic material conformed to said general contour and bonded to the inner side of said body in transverse relation to said strips, elongated template elements of plastic material bonded to and along the outer side surface only of said body in outwardly projecting relation thereto and in opposed relation to said supports, said template elements extending in the line of the outer cross-sectional contour of said body and presenting longitudinally shaped outer reference edges which are in conformity with the outer contour of said structure in the direction of said contour line, and plastic molding material bonded to the outer side of said body and to and between said template elements in laterally flush relation to said reference edges thereof.

8. A master model or like structure, comprising a supporting base fabricated of a series of strips of cured glass fiber arranged side by side in a single layer to provide a sheet-like body which has a shaped outer cross-sectional contour generally corresponding to that of said structure, reinforcing means for said body comprising elongated tubes of plastic material conformed to said general contour and bonded to the inner side of said body to extend transversely of said strips, a layer of glass fiber material bonded to said body and covering the inner side of said tubes and body, thin elongated template elements of plastic material bonded to the outer side surface only of said body in parallel and opposed relation to said tubes, said template elements presenting longitudinally shaped outer reference edges which are in conformity with the outer contour of said structure in the direction of said line, and plastic molding material bonded to the outer side of said body and to and between said template elements in laterally flush relation to said reference edges thereof.

9. A master model or like structure, comprising a shaped base body having a shaped outer contour generally corresponding to that of said structure, at least one template member of plastic material bonded to the outer side surface only of said body, said template member projecting outwardly of said body and presenting a shaped outer reference surface in conformity with said outer contour of said structure in at least one direction, and plastic molding material bonded to said outer side surface of said body and to said template member in laterally flush relation to said reference surface of the latter.

10. A structure in accordance with claim 9, in which said template member comprises an elongated relatively thin length of said plastic material extending in the direction of a line of outer contour of said body and said structure.

11. A structure in accordance with claim 9, in which said body is backed by a rigid support structure, including at least one elongated supporting member conformed and secured to the inner surface of said body along a line of said outer contour.

References Cited in the file of this patent

UNITED STATES PATENTS

| Number | Name | Date |
|---|---|---|
| 2,052,490 | Reinhardt | Aug. 25, 1936 |
| 2,321,529 | Le Roy | Feb. 11, 1941 |
| 2,274,060 | Hart | Feb. 24, 1942 |
| 2,371,047 | Groehn | Mar. 6, 1945 |
| 2,460,242 | Renaud | Jan. 25, 1949 |
| 2,625,748 | Renaud | Jan. 20, 1953 |
| 2,652,595 | Kish | Sept. 22, 1953 |
| 2,682,111 | Kish | June 29, 1954 |
| 2,694,027 | Calkins | Nov. 9, 1954 |
| 2,694,863 | Kish | Nov. 23, 1954 |
| 2,715,596 | Hawley | Aug. 16, 1955 |
| 2,755,510 | Rauter | July 24, 1956 |
| 2,777,790 | Kish | Jan. 15, 1957 |

OTHER REFERENCES

Tooling and Production, pages 71–74, Aug. 1955, 33–174G.